(12) United States Patent
Schultze

(10) Patent No.: X7035
(45) Date of Patent: Apr. 30, 1832

(54) BLEACHING BEES WAX YELLOW

(76) Inventor: John N. Schultze

John N Shultz of New York City
Letters Patent.

The Schedule referred to in these Letters Patent and making part of the same containing a description in the words of the said John N Shultz himself of his Improvement in the mode of Bleaching yellow Bees wax.

To all persons to whom these presents shall come. I John N Shultze of the City of New York Chymist Send Greeting. Be it Known that I the said John N Shultze, have invented made and applied to use a new, useful improvement in the mode of bleaching yellow bees wax in such a manner as to render the same of a beautiful white colour fit for burning and other purposes to which white wax is usually applied to which I give the name of alabaster wax The process of bleaching may be conveniently performed as follows. prepare the vats of oak boards and nearly equal in size and placed adjacent to each other. their dimensions about four feet long three feet wide and three feet deep, to be numbered 1. 2. 3. & 4.

Into the vat No 1. put 125 gallons cold water add to this 200 lb oxy muriate of lime of best quality (oxymuriate of Potash or Soda have been applied for the same purpose with equal success but owing to their expence being too high have not recently been used) Agitate this mixture with a wooden spatula for about one quarter of an hour then suffer the excess of lime to settle.

Into vat No 2. place five hundred pounds of good yellow Bees wax by an application of steam this wax is melted (instead of steam direct application of fuel will answer the same purpose) when melted the steam withdrawn from this vat and the impurities of the wax suffered to settle for half an hour. Into vat No 3. pour this wax from its deposit, and by applying steam and continued stirring the above clear solution of oxymuriate of lime is added at intervals so as to keep the wax in a liquid state. by this operation the wax assumes a white appearance the quantity of the solution of oxymuriate of lime used in the first process depends on the quantity of colouring matter in the wax, but generally nearly all the clear solution is applied. Should the quantity of the solution added be in excess of the colouring matter in the wax an unpleasant acid taste on the tongue will be perceived, otherwise a saline taste.

This operation under continued stirring and heat by steam is ended within one hour then add 20lb concentrated sulphuric acid previously diluted with 30lb of cold water all other acids can be used with equal success. but they are too expensive. by this addition and continued agitation for half an hour the caustic lime and water &c which are united with the wax are separated from it; and the wax so separated from the water &c. floats on the surface. The steam is now withdrawn; and the water sulphate of lime &c in half an hour settle to the bottom of the vat.

Should the wax not be of sufficient whiteness after the water and sulphate of Lime are separated, the operation is repeated but, previously in vat No 1. seventy five gallons of water must be again poured and well strained, and the lime allowed to deposit. it is seldom that one process renders the wax sufficiently white and I have therefore to repeat the operation; and even sometimes a third time.

When sufficiently white, say after the second operation and after one hour settling pour the white wax which yet contains some water &c. into vat No 4. which is also heated by steam; being careful to take as little of the settled water as possible. When this is done add 30lbs of coarse salt (muriate of soda or any other salt or substance which is soluble in water & which renders it specifically heavier) but for economy I have taken muriate of soda) this salt has no action on the wax but becomes soluble in the water, and separates it from the wax by settling below the wax. where the liquid wax requires a clear transparent appearance; though by continued stirring, withdraw the steam and suffer it to settle for one hour then pour the wax carefully from the salt water, in such vessels as you may wish for cooling In order to give this wax a clear white appearance, I have added in vat No 4. previous to its being poured out one oz pulverized —

Antwerp blue previously mixed with one quart of this melted wax.
N.B. Should the oxymuriate of Lime in vat No 3. be in excess by the
addition of Sulphuric acid a very offensive smell will ensue for about
ten minutes, which is also unhealthy, being oxymuriatic Gas. & therefore
care should be taken not to inhale it.

The heat applyed to wax in this process, should not at any time exceed
160 degrees – The size & figure of the vats may of course be varied ac-
-cording to the quantity of wax to be whitened and application of heat
may be direct to the materials instead of by steam. In testimony
that the above is a true specification of my said improvement as above
described. I have hereunto set my hand this 13th day of April
in the year of our Lord one thousand eight hundred and thirty two.

Witnesses
Elisha H. Wildey
H Silliman

John N. Shultze.

(Patented 30 April 1832)

(962)